United States Patent [19]

Germano et al.

[11] 4,334,362

[45] Jun. 15, 1982

[54] BIDIMENSIONAL TRACER OF MACHINE TOOLS OR MEASURING MACHINES

[75] Inventors: Francesco Germano, Turin; Ugo Cavicchioli, Borgaro Torinese, both of Italy

[73] Assignee: DEA Digital Electronic Automation SpA, Turin, Italy

[21] Appl. No.: 35,591

[22] Filed: May 3, 1979

[30] Foreign Application Priority Data

May 9, 1978 [IT] Italy ............................. 68052 A/78

[51] Int. Cl.³ .............................................. G01B 7/02
[52] U.S. Cl. .............................. 33/174 L; 33/169 R; 33/172 E
[58] Field of Search ............. 33/169 R, 174 E, 172 L, 33/1 M, 174 P

[56] References Cited

U.S. PATENT DOCUMENTS

| | | | |
|---|---|---|---|
| 2,499,665 | 3/1950 | Mestas | 33/172 E X |
| 3,362,076 | 1/1968 | Bailey | 33/169 C |
| 3,990,153 | 11/1976 | Calame | 33/172 E X |
| 4,078,314 | 3/1978 | McMurtry | 33/172 E X |
| 4,130,941 | 12/1978 | Amsbury | 33/172 E X |
| 4,158,919 | 6/1979 | McMurtry | 33/143 L X |

*Primary Examiner*—Harry N. Haroian
*Attorney, Agent, or Firm*—Gifford, VanOphem, Sheridan & Sprinkle

[57] ABSTRACT

A bidimensional tracer for machine tools or measuring machines is described. Said tracer comprises a body for the connection to the machine, an end arranged to come into contact with a surface, and two detector elements apt to emit signals of detection of the movements of the said end, along two orthogonal directions, produced by the contact with the said surface.

The main characteristic of the tracer is that said detector elements simultaneously detect the said movements along the said two directions, the said two detector elements comprising each a portion stationary relative to the said connection body and a portion movable as a function of the movements of the said end.

14 Claims, 7 Drawing Figures

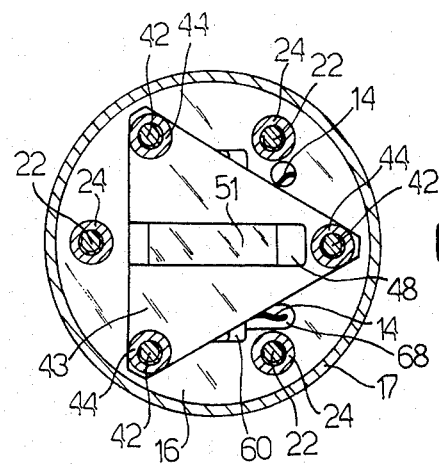
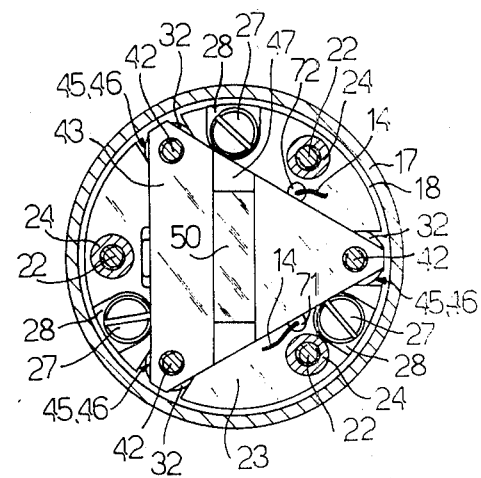
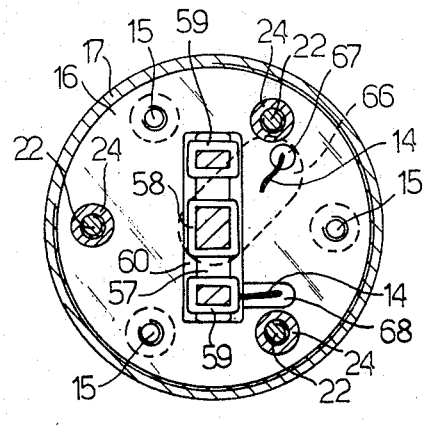

BIDIMENSIONAL TRACER OF MACHINE TOOLS OR MEASURING MACHINES

BACKGROUND OF THE INVENTION

The present invention relates to a bidimensional tracer for machine tools or measuring machines, which comprises a body having the form of a cylindrical tang for connection to the machine, and a terminal bar having an end which is pointed or ball-shaped or simulates a tool and is intended to come into contact with a surface on which the operation is to be carried out, and further comprises means which emit detection signals of the movements of the said end along two orthogonal directions, which take place in consequence of the contact of the said end with the surface on which the operation is being carried out.

The prior art bidimensional tracers do not work in a completely satisfactory manner, inasmuch as they either are not practical in use because of their inability to detect the movements of the end of the bar in the two orthogonal direction simultaneously or do not ensure a detection of such movements with the precision required for particular applications, which precision may reach even the level of one tenth of a $\mu m$, or do not have a sufficiently repeatable rest position.

SUMMARY OF THE INVENTION

It is an object of the present invention to provide a bidimensional tracer which will not have the aforementioned disadvantages, and will therefore be able to be advantageously used mainly in the detection of the profiles of models of mechanical pieces according to detection systems of known type, such as for example scanning measurement or contour measurement or point by point measurement.

In particular, it is an object of the present invention to provide a bidimensional tracer apt to be used under direct connection to the measuring machine or to the machine tool, i.e. a tracer which will be able to be connected to the end of a column movable by the movable carriages of the machine, generally in the three orthogonal directions, and which will moreover be apt to be used as an interlocking sensor of a tracer provided with electric motors for moving a detection bar along orthogonal directions (for example, of the type described in the Italian Patent Application No. 68681-A/77 of the same Applicant). In fact, generally such tracers provided with electric motors are used with machines of relatively large overall dimensions, i.e. machines which have a considerable inertia, so that it is useful to have an interlocking sensor, disposed on the said detection bar, to control the said motors of the tracer, so as to obtain a relatively reduced inertia of the system of detection of the surface which will allow to absorb the more rapid variations in the discontinuity of the surface to be scanned, so that the end of the sensor will always be maintained in contact with the surface to be detected.

According to the present invention there is provided a bidimensional tracer for machine tools or measuring machines, comprising a body for connection to the said machine, an end arranged to come into contact with a surface, and means for emitting signals of detection of the movements of the said end, along two orthogonal directions, produced by the contact with the said surface, wherein the said means comprise two separate detecting elements for the simultaneous detection of the said movements along the said two directions, the said two detector elements comprising each a portion stationary relative to the said connection body and a portion movable as a function of the movements of the said end.

BRIEF DESCRIPTION OF THE DRAWINGS

For a better understanding of the present invention an embodiment of the invention will now be described by way of non limiting example with reference to the accompanying drawings in which:

FIGS. 2, 3, 4, 5, 6 and 7 are sectional views along lines II—II, III—III, IV—IV, V—V, VI—VI and VII—VII respectively, of the tracer shown in FIG. 1.

DETAILED DESCRIPTION OF THE INVENTION

Figure 1:
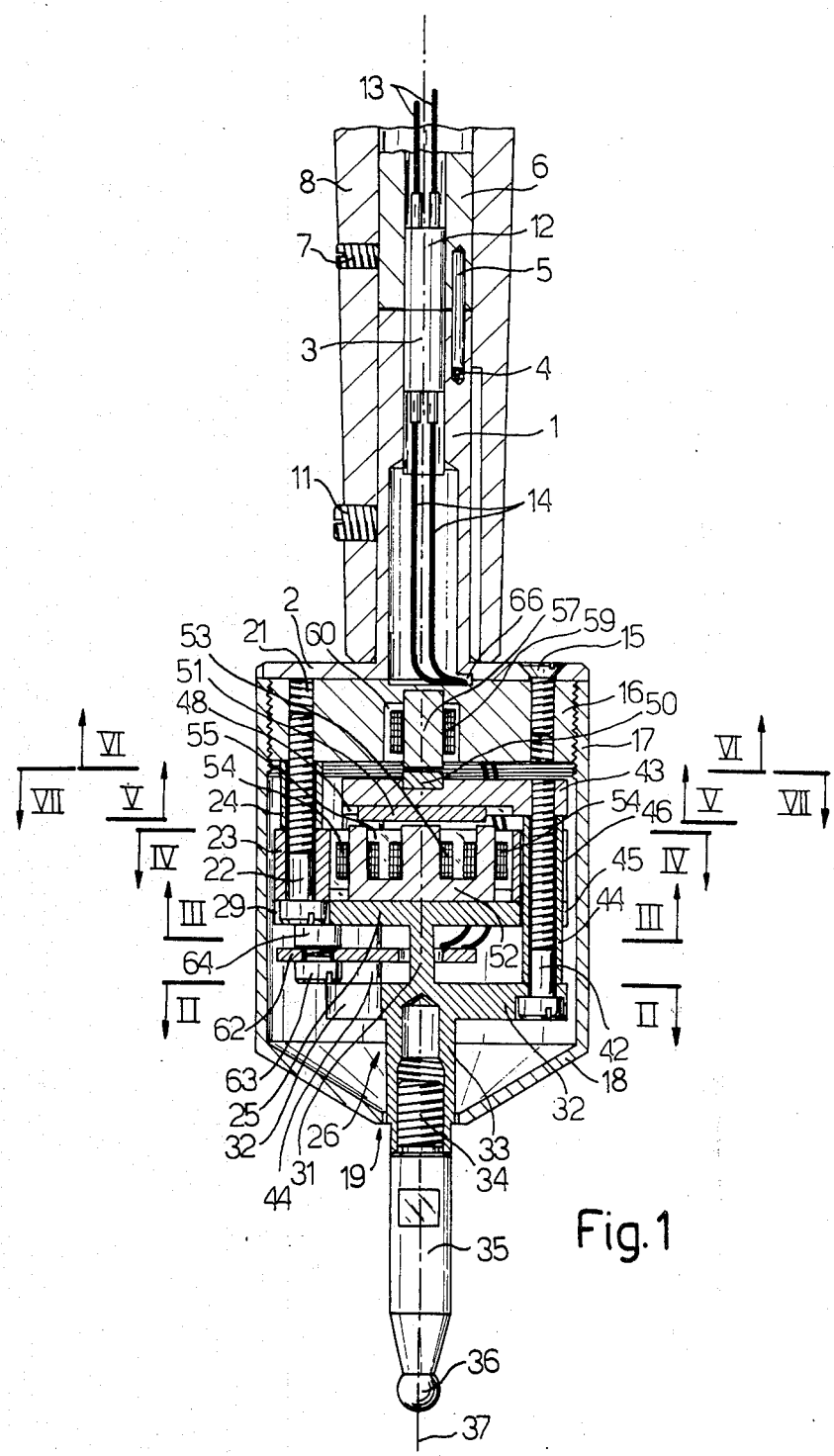
FIG. 1 is a sectional side view of the tracer according to the present invention.
Figure 2:
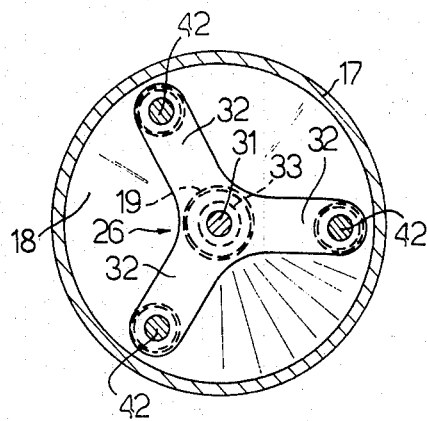
Figure 3:
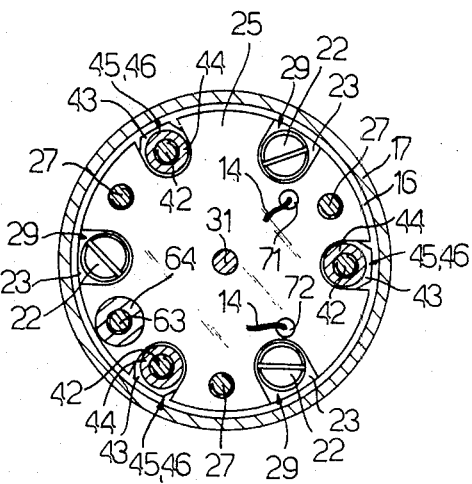
Figure 4:
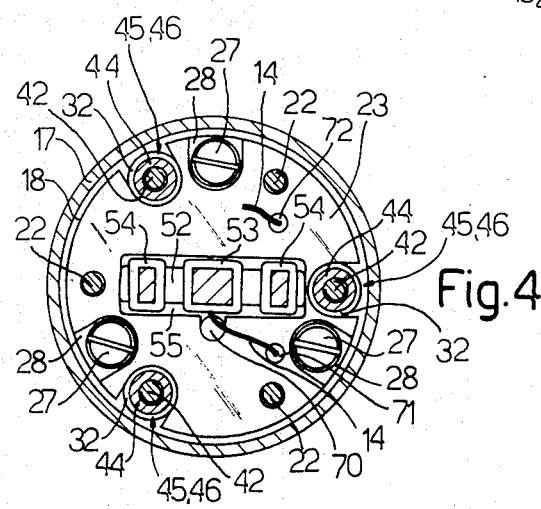

Referring now to FIGS. from 1 to 7, the tracer according to the present invention comprises a cylindrical tang 1 which originates from a circular cover 2 and is provided, in its upper portion, with an electric connection block 3 and a recess 4 apt to receive a pin 5 fastened to a body 6 which is locked, by means of a dowel 7, inside a body 8. The said body 8 may be part of the end of a column of a measuring machine or a machine tool, movable by the carriages of the machine, or may be formed by the end portion of a detection bar projecting from the lower portion of a tracer provided with electric motors for moving the said bar, for example of the type described in the Italian Patent Application No. 68681-A/77. Disposed towards the lower portion of the said body 8 is a dowel 11 which cooperates to lock the cylindrical tang 1. Furthermore, fixed inside the body 6 is an electric connection block 12 which has, connected to its upper terminals, wires 13 for connection to the machine, whilst in its lower portion it is connected to block 3 having electric connection wires 14 extending therefrom.

Cover 2 is fixed, by means of three screws 15, to a body 16 which is circular in shape and provided with an external thread, so that it is screwed within the upper portion of an outer cylindrical housing 17 having a lower truncated conical section 18 provided with a central hole 19.

Body 16 has also three holes 21 into which the stems of three screws 22 are screwed whose head bears against the lower surface of a circular body 23. The facing surfaces of the bodies 16 and 23, though being rigidly connected to one another by the tightened screws 22, are maintained spaced from one another by three cylindrical spacers 24 disposed around the three screws 22.

A circular portion 25 of a body 26 is rigidly clamped on the lower surface of the body 23 by means of three screws 27 whose heads bear in recesses 28 of the body 23 and whose stems are screwed into the portion 25.

Moreover, the said portion 25 has three recesses 29 for the passage of the heads of the screws 22 against the body 23.

Extending downwards from the center of the portion 25 is a cylindrical portion 31 which is integral with the portion 25 and from the lower end of which are branched three arms 32 equispaced by 120°.

Body 26, beneath the arms 32, has in its center a cylindrical hollow portion 33 which projects through the hole 19 and has an inner thread so as to allow screwing an upper section 34 of a detection bar 35 which carries at its end a ball 36 intended to be brought into contact with a surface to be scanned.

The three arms 32 are contained in a plane perpendicular to an axis of symmetry 37 of the tracer, which axis coincides with the axis of the bar 35, whilst the axis of the cylindrical portion 31 coincides with the said axis 37. The cross-section of the cylindrical portion 31, in the plane perpendicular to axis 37, is relatively reduced with respect to the total cross-section of the arms 32 and to the cross-section of the portion 25, so as to allow a repeatable movement of the assembly of arms 32 relative to the portion 25, thanks to the resilient deformation of the portion 31 under the action of a movement imparted to the ball 36.

Conveniently, the body 26 is made of a material which has the desired characteristics of sufficient rigidity and resilient deformability, for example steel.

Bearing on the end of the three arms 32 are the heads of three screws 42, whose stems are screwed, in the upper portion, towards the apexes of a triangular body 43. The said body 43, though being rigidly coupled, is spaced from the three arms 32 by means of three cylindrical spacers 44 disposed around the three screws 44 and passing through three recesses 45 and three recesses 46 formed in the portion 25 and the body 23 respectively.

Body 43 has two recesses 47 and 48 formed, respectively, on the upper and lower surface, in which there are fixed two ferromagnetic blocks 50 and 51 respectively, having substantially the configuration of a parallelepiped, which are disposed with the major axis along the one or the other of two orthogonal directions contained in the plane perpendicular to the axis 37, and form the two movable cores of two transformers arranged to detect the movements of the ball 36 in the said two orthogonal directions.

Facing the lower side of the block 51 are the three ends of the stems of an E-shaped ferromagnetic block 52 which constitutes the fixed core of one of the said two transformers.

Wound around the central stem and the two side stems of the block 52 are a primary winding 53 and two secondary windings 54, respectively, from which the electric detection signal of the movement of the ball 36 along the direction of the axis of block 51 is obtained. Block 52 is housed within a rectangular recess 55 formed in the body 23 and is fastened to this latter, conveniently by means of an adhesive introduced into the recess 55.

Facing the upper side of block 50 are the three ends of the stems of an E-shaped ferromagnetic block 57 which constitutes the fixed core of the other of the said two transformers. Wound around the central stem and the two side stems of block 57 are, respectively, a primary winding 58 and two secondary windings 59, from which the electric detection signal of the movement of the ball 32 along the direction of the axis of block 50 is obtained. Also block 57 is housed within a rectangular recess 60 formed in the body 16 and is fixed to this latter, conveniently by means of an adhesive introduced into the recess 60.

The passage of the wires 14 serving to provide the electric connection to the two transformers and the elements which carry out a first processing of the signals coming from the transformers, which transformers pertain to a printed circuit 62 which is fixed to the lower region of the portion 25 by means of a screw 63 with the interposition of a spacer 64, is obtained by means of a first recess 66 formed in the lower surface of the cover 2 and in the upper surface of body 16 in a radial direction, a through hole 67 formed in the body 16, a recess 68 formed in the lower surface of body 16 and connected to the recess 60 for the connection to the first transformer, a recess 70 formed in the body 23 and connected to the recess 55 for the connection to the second transformer, and two through holes 71 and 72 formed in the body 23 and the portion 25 to allow the connection to the printed circuit 62.

Finally, the bodies 16, 23 and 43 supporting the stationary and the movable portions of the two transformers are made of a non ferromagnetic material; conveniently, they, as well as the housing 17, are made of aluminium, in order to render relatively reduced the total weight of the tracer.

The operation of the bidimensional tracer according to the present invention is as follows.

Let us suppose that the body 8 constitutes the end portion of a movable column of a machine; therefore, tang 1 will be directly connected to the said machine by introducing it into the body 8, and the positioning of the pin 5 in the recess 4 ensures the correct connection positioning between the electric connection blocks 3 and 12.

Thus, under the control imparted by the machine for the movements of the column, ball 36 is brought into contact with a surface which has to be detected, according to one of the known detection methods. Therefore, ball 36 moves away from its position of equilibrium (with values which are in the order of one $\mu$m) along directions contained in the plane perpendicular to the axis 37, and such movement is allowed by the cylindrical portion 31 of reduced cross-section, which allows the movement of the three arms 32 relative to the portion 25 which, instead, remains stationary relative to the axis 37, for the rigid connection to the tang 1 by means of the screws 27, the body 23, the screws 22, the body 16 and the screws 15.

The said movement is of the resilient type, so that ball 36, when it becomes free again, returns to its original zero position, and the maximum permissible value of movement, in order to avoid yielding phenomena, is limited by the diameter of the hole 19 of the end section 18 of the housing 17.

Therefore, the said movement of the arms 32 gives rise to a corresponding movement of the body 43 and, consequently, the two blocks 50 and 51 which constitute the movable parts of the core of the two transformers.

The movement of the blocks 50 and 51 relative to the corresponding stationary blocks 57 and 52 gives rise, in the said two transformers, to signals of detection of the movement of the ball 36 along two orthogonal directions contained in the plane perpendicular to the axis 37 (which coincide with the planes of symmetry of the said transformers).

Thus, with the tracer according to the present invention there is obtained the advantage of having a simultaneous detection, along the said two orthogonal directions, of the movements of the end of the tracer, with consequent improvements and versatility of application, and moreover, thanks to the structure of the tracer itself, in the detection of such movements during the return to the rest position a very high degree of precision, even in the order of 1/10 of a micron, is obtained.

The signals which are a function of the said detection values of the movements may then be utilized in the manner deemed to be the most suitable; for example, they can be sent directly to control the movements of the column of the machine so as to always bring the tracer towards its position of equilibrium, i.e. with the bar 35 in a not deflected position, or it is possible to set in the control computer of the machine a deflection value for the said bar 35 so that the column will be operated to move in such a manner as to make the said bar 35 assume the said deflection value; this is particularly useful in some stages of detection of a surface, in order to ensure during the scanning of the surface a substantially continuous contact, under a uniform pressure, of the ball 36 on the said surface. Obviously, the said predetermined deflection value is variable at will and is a function of various parameters, such as the speed of detection, the type of detection tip, the type of surface to be scanned etc.

Finally, particularly advantageous is the utilization of the tracer of the present invention as an interlocking sensor for a tracer provided with motors, as already mentioned hereinabove, in which case the said body 8 would form the end portion of the detection bar of such a tracer provided with motors.

In this case, the movement detection signals coming from the two transformers would conveniently be sent to control the electric motors of the tracer which control the corresponding movements, whilst the movements of the bar of the motorized tracer would control the movements of the column to which the said motorized tracer is connected.

In this way, even in the case of large machines it would be possible to carry out detections at a relatively high speed, since there would be a rapid adaptation of the detection tip to the profile of the surface, inasmuch as the position of the said tip may be controlled in a very precise and rapid manner directly by the motors of the tracer.

Of course, also in this type of application with a motorized tracer a deflection value may be programmed for the bar 35, in order to have a type of operation with a substantially continuous force of detection contact, as described.

Finally, it is clear that many modifications and variations may by applied to the embodiment described and illustrated of the tracer according to the present invention, without departing from the scope of the inventive idea contained in the invention.

What we claim is:

1. A bidimensional tracer for machine tools or measuring machines, comprising a body for connection to said machine, a detection bar extending outwardly from said connection body arranged to come into contact with a surface, and means for emitting signals of detection of the movements of said detection bar along two orthogonal directions produced by the contact of the detection bar with said surface, wherein said means comprises two separate detector elements for simultaneously detecting said movements along said two directions, said two detector elements comprising each a portion stationary relative to said connection body and a portion movable as a function of said movements of said detection bar, wherein said movable portion of said detector elements is rigidly connected to said detection bar by means of a first portion of a one-piece intermediate body, of which a second portion is rigidly connected to said connection body, the connection between said first and said second portions of said intermediate body being obtained by means of a third portion of reduced cross section in a plane parallel to the plane of said two orthogonal directions, relative to the cross sections of said first and said second portions, so as to allow a resilient movement of said first portion relative to said second portion when said detection bar comes into contact with said surface, said tracer further comprising a support body, said movable portions of said detector elements being rigidly fastened to said support body, and means for rigidly connecting said support body in a spaced apart relation to the first portion of the intermediate body, said last mentioned means three equal height columns extending between said support body and the first portion of the intermediate body.

2. A tracer as defined in claim 1, wherein said third portion of said intermediate body is cylindrical in shape and is disposed with its axis perpendicular to the plane of said two orthogonal directions.

3. A tracer as defined in claim 1, wherein said third portion of said intermediate body is integral with said first and second portions of said intermediate body.

4. A tracer as defined in claim 1, wherein said intermediate body is made of steel.

5. A tracer as defined in claim 1, wherein said first portion of said intermediate body has three equidistantly spaced arms connected to each other by a central zone, said third portion of said intermediate body being attached to said central zone and the outer ends of said three arms being rigidly connected to said support body by means of said three columns.

6. A tracer as defined in claim 1, wherein said stationary portions of said two detector elements are each fastened to a respective further support body, said two further support bodies being rigidly connected to said connection body.

7. A tracer as defined in claim 6, wherein said two further support bodies are rigidly spaced from one another by means of further support columns.

8. A tracer as defined in claim 6, wherein said second portion of said intermediate body is rigidly connected to one of said two further support bodies.

9. A tracer as defined in claim 1, wherein said detector elements each comprises a transformer.

10. A tracer as defined in claim 9, wherein the each detector element stationary portion comprises a ferromagnetic core with electric windings which generate detection signals of the movements of said detection bar and that each detector element movable portion comprises a ferromagnetic core.

11. A tracer as defined in claim 10, wherein said movable portions of said detector elements are substantially parallelepiped in shape and are disposed with the major axis along the one or the other of said two orthogonal directions, respectively.

12. A tracer as defined in claim 11, wherein said two stationary portions of said detector elements are substantially E-shaped and have outwardly extending stems and are disposed with the free ends of the stems substantially in front of their respective movable portions.

13. A tracer as defined in claim 1, wherein said connection body has the configuration of a cylindrical tang and has housed therein an electric connection block and means for aligning the connection block for the electrical and mechanical connection of said machine.

14. A bidimensional tracer for machine tools or measuring machines, comprising:

a body for connection to said machine, a detection bar extending outwardly from said connection body arranged to come into contact with a surface, means for emitting signals of detection of the movements of said detection bar along two orthogonal directions produced by the contact of the detection bar with said surface, wherein said emitting means comprises two separate detector elements for simultaneously detecting said movements along said two directions, said two detector elements comprising each a portion stationary relative to said connection body and a portion movable as a function of said movements of said detection bar, a one-piece intermediate body comprising a first portion, a second portion and a third portion, a support body and means for rigidly securing said support body to said intermediate body first portion in a spaced apart relationship, wherein said movable portions of said detector elements are rigidly connected to said support body, means for rigidly connecting said intermediate body second portion to said connection body, means for connecting said first and said second portions of said intermediate body together by a third portion of said intermediate body, said intermediate body third portion having a reduced cross sectional area in a plane parallel to the plane of said two orthogonal directions with respect to the cross sectional areas of said first and said second intermediate body portions so as to allow a resilient movement of said first portion relative to said second portion when said detection bar comes into contact with said surface, wherein said support body with its attached detector element movable portions is positioned in between said detector element stationary portions, and wherein said detector elements are aligned with the axis of the detector bar.

* * * * *